(12) United States Patent
Yanaka et al.

(10) Patent No.: US 11,787,480 B2
(45) Date of Patent: Oct. 17, 2023

(54) VEHICLE

(71) Applicant: TOYOTA JIDOSHA KABUSHIKI KAISHA, Toyota (JP)

(72) Inventors: Akihiro Yanaka, Nagoya (JP); Shinji Kurachi, Kariya (JP); Shunsuke Teruyama, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 17/516,163

(22) Filed: Nov. 1, 2021

(65) Prior Publication Data

US 2022/0161865 A1 May 26, 2022

(30) Foreign Application Priority Data

Nov. 24, 2020 (JP) ................................. 2020-194124

(51) Int. Cl.
*B62D 25/20* (2006.01)
*B60K 26/02* (2006.01)

(52) U.S. Cl.
CPC .............. *B62D 25/20* (2013.01); *B60K 26/02* (2013.01)

(58) Field of Classification Search
CPC .. B62D 25/20; B60K 26/02; B60K 2026/025; B60K 26/021; B60Y 2306/01; B60T 7/06; B60T 7/065
USPC ................................................... 296/193.07
See application file for complete search history.

(56) References Cited

U.S. PATENT DOCUMENTS

| 7,055,893 | B2 * | 6/2006 | Yamamura | B62D 21/15 |
| | | | | 296/97.23 |
| 9,126,636 | B2 * | 9/2015 | Ikeno | B60R 21/04 |
| 9,718,417 | B2 * | 8/2017 | Singh | B62D 25/20 |
| 2011/0068608 | A1 * | 3/2011 | Ohtsubo | B60N 2/074 |
| | | | | 296/193.07 |

FOREIGN PATENT DOCUMENTS

| JP | 2000-095150 A | 4/2000 |
| JP | 2001-219872 A | 8/2001 |
| JP | 2008-174061 A | 7/2008 |
| JP | 2011201510 A | * 10/2011 ............. B60N 2/067 |

* cited by examiner

*Primary Examiner* — Pinel E Romain
(74) *Attorney, Agent, or Firm* — Dinsmore & Shohl LLP

(57) ABSTRACT

The technique disclosed in the present specification is embodied as a vehicle. The vehicle includes a floor panel and a pedal. The floor panel constitutes a floor of a vehicle cabin of the vehicle and has an inclined portion in a front portion of the floor panel. The inclined portion is inclined upward toward a front side of the vehicle. The pedal is disposed rearward of the inclined portion of the floor panel in a vehicle front-rear direction and operated by a driver of the vehicle toward the inclined portion. A raised portion that is raised toward the vehicle cabin is provided integrally with the inclined portion of the floor panel. When the driver places a foot on the pedal, the raised portion is located forward of a heel portion of the foot in the vehicle front-rear direction.

6 Claims, 4 Drawing Sheets

VEHICLE

CROSS-REFERENCE TO RELATED APPLICATION

This application claims priority to Japanese Patent Application No. 2020-194124 filed on Nov. 24, 2020, incorporated herein by reference in its entirety.

BACKGROUND

1. Technical Field

The technique disclosed in the present specification relates to a vehicle. In particular, the present disclosure relates to a vehicle provided with a floor panel that constitutes the floor of a vehicle cabin and has an inclined portion in a front portion of the floor panel. The inclined portion is inclined upward toward the front side of the vehicle.

2. Description of Related Art

In a vehicle described in Japanese Unexamined Patent Application Publication No. 2000-095150 (JP 2000-095150 A), a bracket is fixed to the inclined portion of the floor panel. When a driver places a foot on a pedal, the bracket is located forward of a heel portion of the foot in a vehicle front-rear direction. When a frontal collision occurs with the vehicle, the bracket contacts the heel portion that has moved forward in the vehicle. The bracket restricts forward movement of the heel portion in the vehicle while the bracket is deformed forward in the vehicle. With this configuration, the bracket absorbs a shock applied to the heel portion and suppresses that only a toe of the driver is pushed rearward in the vehicle. This type of bracket is also called a tibia pad.

SUMMARY

In the vehicle described in JP 2000-095150 A, the bracket is deformed forward in the vehicle. Therefore, a space for deforming the bracket is required. For example, in a small-sized vehicle, it may be difficult to secure a space for deforming the bracket. The present specification provides a technique that replaces the conventional bracket (tibia pad) and can regulate the forward movement of the heel portion in the vehicle within a small space.

The technique disclosed in the present specification is embodied as a vehicle. The vehicle includes a floor panel and a pedal. The floor panel constitutes a floor of a vehicle cabin of the vehicle and has an inclined portion in a front portion of the floor panel. The inclined portion is inclined upward toward a front side of the vehicle. A pedal is disposed rearward of the inclined portion of the floor panel in a vehicle front-rear direction and operated by a driver of the vehicle toward the inclined portion. A raised portion that is raised toward the vehicle cabin is provided integrally with the inclined portion of the floor panel. When the driver places a foot on the pedal, the raised portion is located forward of a heel portion of the foot in the vehicle front-rear direction.

When a frontal collision occurs with the vehicle, a colliding object moves the structure in a front portion of the vehicle toward the driver (that is, rearward in the vehicle). At that time, the inclined portion of the floor panel presses the pedal disposed rearward in the vehicle front-rear direction against the foot of the driver. The raised portion that is located forward of the heel portion of the foot in the vehicle front-rear direction when the driver places the foot on the pedal is provided integrally with the inclined portion of the vehicle described above. The raised portion is raised toward the vehicle cabin. Therefore, when a frontal collision occurs and the inclined portion of the floor panel presses the pedal against the foot of the driver, the raised portion comes into contact with the heel portion of the foot of the driver. As a result, forward movement of the heel portion in the vehicle is restricted, thereby suppressing that only a toe of the foot is pushed rearward in the vehicle.

Further, in the vehicle described above, the raised portion is provided integrally with the inclined portion of the floor panel. Therefore, it is not necessary to add a separate part such as a bracket. Accordingly, the vehicle disclosed in the present specification can reduce the number of parts, the mass, and the like.

Details of the techniques disclosed in the present specification and further modifications will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
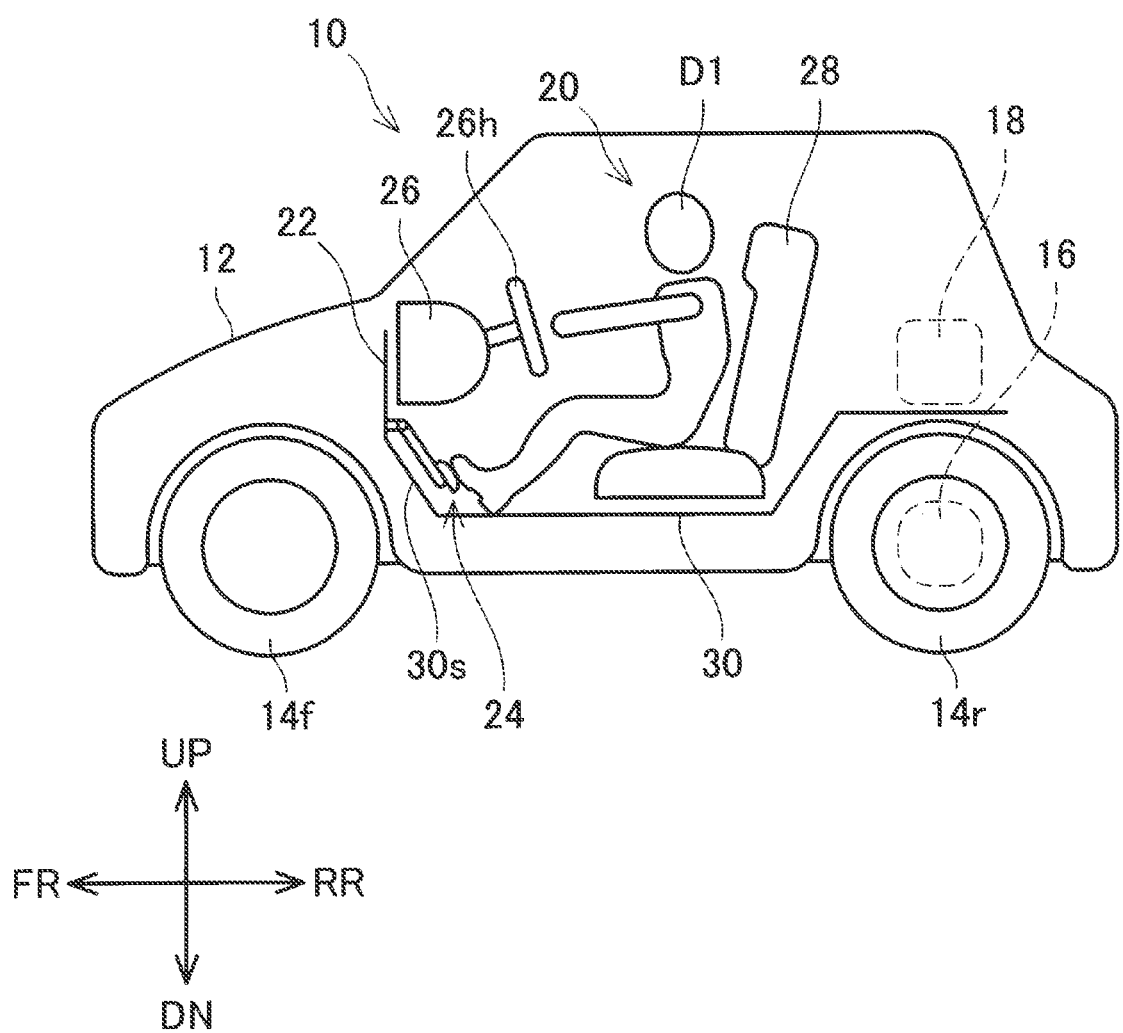
FIG. 1 is a left side view schematically showing the entire vehicle according to an embodiment.

In an embodiment of the present technique, the raised portion may have a peak portion extending along a vehicle width direction and a contact surface spreading rearward from the peak portion in a vehicle front-rear direction, and when the driver places a foot on the pedal, the contact surface may be located forward of a heel portion of the foot in the vehicle front-rear direction. With such a configuration, the contact surface that spreads rearward from the peak portion extending in the vehicle front-rear direction along the vehicle width direction more easily comes into contact with the heel portion of the foot.

In the embodiment of the present technique, when the pedal comes closest to the inclined portion, at least a part of the pedal may be located forward, in the vehicle front-rear direction, of an extension surface that is an extension of the contact surface toward the pedal. With such a configuration, when the foot of the driver is pushed rearward in the vehicle by the pedal and the contact surface, it is possible to suppress a change in an angle of an ankle of the driver.

In the embodiment of the present technique, the peak portion of the raised portion may be located below a center of the heel portion of the driver. With such a configuration, when the driver normally operates the pedal, it is difficult for the foot to come into contact with the raised portion. As a result, it is possible to suppress the driver who operates the vehicle from feeling uncomfortable.

In the embodiment of the present technique, the pedal may be an accelerator pedal that accelerates the vehicle as the accelerator pedal is operated toward the inclined portion.

However, in another embodiment, the pedal may be a brake pedal that stops the vehicle when the brake pedal comes close to the inclined portion.

Embodiment

A vehicle according to an embodiment will be described in detail below with reference to the drawings. A vehicle 10 according to the embodiment will be described with reference to FIG. 1. The vehicle 10 is a so-called automobile and a vehicle traveling on a road surface. Here, the direction FR in the drawing indicates the front in a front-rear direction (longitudinal direction) of the vehicle 10, and the direction RR indicates the rear in the front-rear direction of the vehicle 10. Further, the direction LH indicates the left side in a right-left direction (width direction) of the vehicle 10, and the direction RH indicates the right side in the right-left direction of the vehicle 10. The direction UP indicates upward in an up-down direction (height direction) of the vehicle 10, and the direction DN indicates the lower direction of the vehicle 10 in the up-down direction. In the present specification, the front-rear direction of the vehicle 10, the right-left direction of the vehicle 10, and the up-down direction of the vehicle 10 may be simply referred to as the front-rear direction, the right-left direction, and the up-down direction, respectively.

As shown in FIG. 1, the vehicle 10 includes a vehicle body 12 and a plurality of wheels 14*f*, 14*r*. The vehicle body 12 is not particularly limited. However, the vehicle body 12 is configured using a metal material and a resin material. The wheels 14*f*, 14*r* are rotatably attached to the vehicle body 12. The wheels 14*f*, 14*r* include a pair of front wheels 14*f* and a pair of rear wheels 14*r*. The number of wheels 14*f*, 14*r* is not limited to four. The vehicle 10 according to the present embodiment has a small size for one person. However, the size of the vehicle 10 and the number of occupants are not particularly limited.

The vehicle 10 further includes a traveling motor 16 and a battery unit 18. The traveling motor 16 is connected to the rear wheels 14*r* and can drive the rear wheels 14*r*. Note that, the traveling motor 16 is not limited to the rear wheels 14*r*, and may be configured to drive at least one of the wheels 14*f*, 14*r*. The battery unit 18 is connected to the traveling motor 16 via a power supply circuit (not shown), and supplies electric power to the traveling motor 16. The battery unit 18 has a plurality of built-in secondary battery cells, and is configured to be repeatedly rechargeable by external power. Note that, the vehicle 10 may include other power sources such as a fuel cell unit and a solar cell panel in addition to or in place of the battery unit 18. Further, the vehicle 10 may include another prime mover such as an engine in addition to or in place of the traveling motor 16.

Next, the structure inside a vehicle cabin 20 of the vehicle 10 will be described. In FIG. 1, the structure inside the vehicle cabin 20 is shown by solid lines. However, in reality, the vehicle cabin 20 is covered with a door (not shown) or the like that constitutes the appearance of the vehicle body 12 of the vehicle 10.

The vehicle cabin 20 is a space for a driver D1 to board. An instrument panel 26, a dash panel 22, a floor panel 30, a pedal module 24, and a seat 28 are disposed in the vehicle cabin 20. Measuring instruments such as a meter (not shown) indicating the vehicle speed of the vehicle 10 are arranged on the instrument panel 26, and a steering wheel 26*h* is disposed rearward of the instrument panel 26 in a vehicle front-rear direction. The driver D1 changes the traveling direction of the vehicle 10 by operating the steering wheel 26*h*.

The dash panel 22 is a wall that separates a front compartment (not shown) of the vehicle 10 from the vehicle cabin 20. The dash panel 22 extends in the up-down direction. A pedal module 24 extending toward the vehicle cabin 20 is fixed to the dash panel 22. When the driver D1 operates the pedal module 24, the vehicle 10 travels or stops. Details of the structure of the pedal module 24 will be described later.

The floor panel 30 extends in the front-rear direction of the vehicle and constitutes the floor of the vehicle cabin 20. The floor panel 30 is typically a sheet metal part and is formed by stamping. An inclined portion 30*s* is provided on the front portion of the floor panel 30 (that is, the portion on the left side in FIG. 1). The inclined portion 30*s* is inclined upward toward the front side of the vehicle and is connected to a lower end portion of the dash panel 22. The pedal module 24 is disposed rearward of the inclined portion 30*s* in the vehicle front-rear direction. A seat 28 is disposed above a rear portion of the floor panel 30. The driver D1 operates the steering wheel 26*h* and the pedal module 24 while being seated on the seat 28. With this configuration, the driver D1 drives the vehicle 10.

Figure 2:
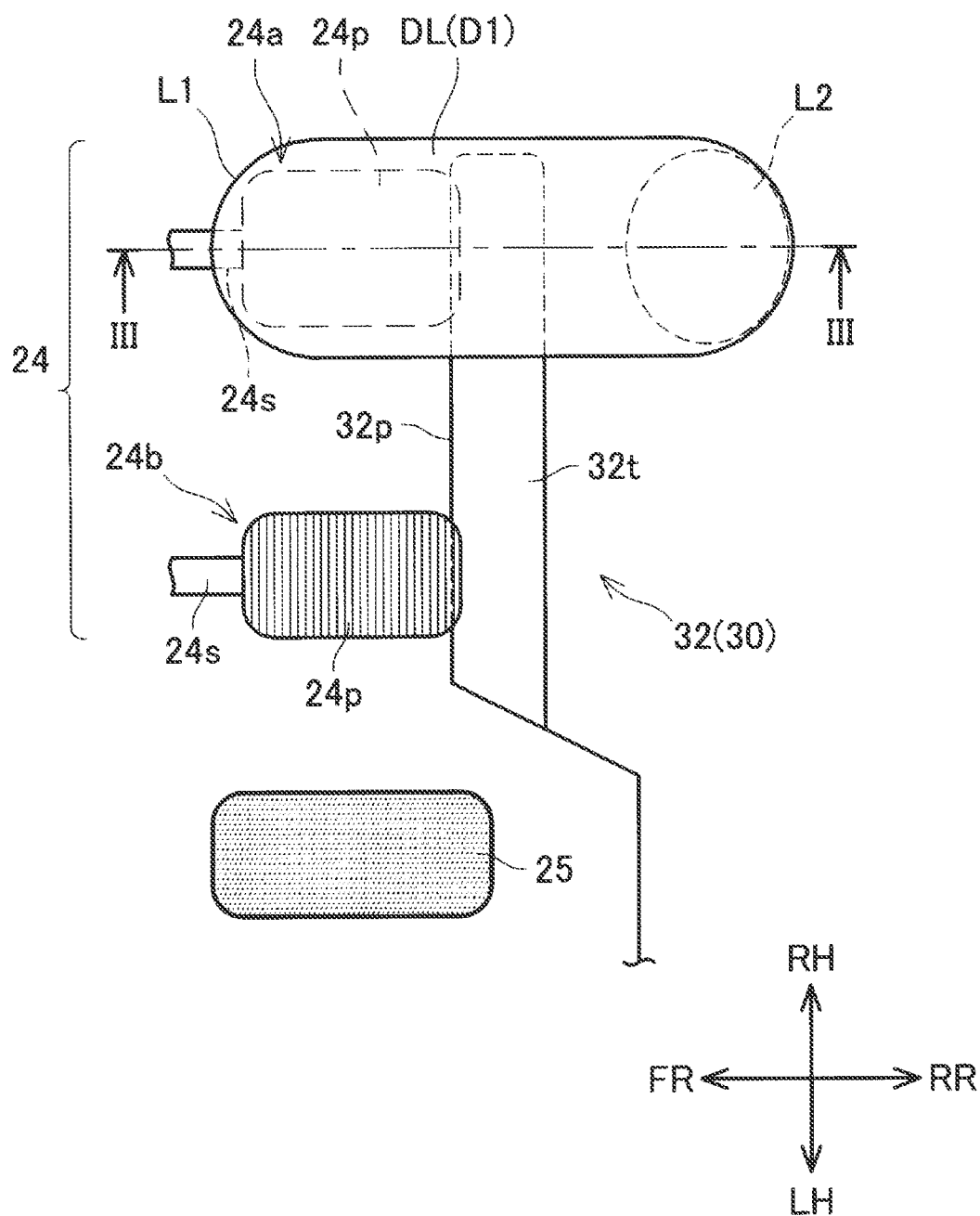
FIG. 2 is a plan view schematically showing a periphery of a pedal module of the vehicle according to the embodiment.

As shown in FIG. 2, the pedal module 24 includes an accelerator pedal 24*a* and a brake pedal 24*b*. The accelerator pedal 24*a* is a pedal for accelerating the vehicle 10 (see FIG. 1). The accelerator pedal 24*a* includes a pedal shaft 24*s* and a pedal body 24*p*. The pedal body 24*p* is displaced in the front-rear direction of the vehicle when the pedal shaft 24*s* is displaced in the front-rear direction of the vehicle (that is, the right-left direction in FIG. 2). The brake pedal 24*b* is disposed on the left side (that is, the lower side in FIG. 2) of the accelerator pedal 24*a* in the vehicle. The brake pedal 24*b* is a pedal for decelerating the vehicle 10. The brake pedal 24*b* also includes a pedal shaft 24*s* and a pedal body 24*p*, and has the structure similar to that of the accelerator pedal 24*a*. As shown in FIG. 2, a foot DL of the driver D1 is placed on the pedal body 24*p* of the accelerator pedal 24*a*. The foot DL of the driver D1 is the right foot of the driver D1 and includes a front portion L1 and a heel portion L2. A footrest 25 is disposed on the left side of the brake pedal 24*b* in the vehicle. A left foot (not shown) of the driver D1 who is seated on the seat 28 (see FIG. 1) is placed on the footrest 25.

A raised portion 32 is provided rearward of the pedal module 24 in the vehicle front-rear direction. The raised portion 32 includes a peak portion 32*p* and a contact surface 32*t*. The peak portion 32*p* is a portion of the raised portion 32 that is most raised toward the vehicle cabin 20 (see FIG. 1). As shown in FIG. 2, the peak portion 32*p* is placed below each pedal body 24*p* of the pedal module 24 (that is, on the depth side with respect to the surface of FIG. 2). The peak portion 32*p* extends in a vehicle width direction (that is, in the up-down direction in FIG. 2) so as to bridge between the accelerator pedal 24*a* and the brake pedal 24*b*. The contact surface 32*t* spreads rearward (that is, on the right side in FIG. 2) of the peak portion 32*p* in the vehicle front-rear direction. The contact surface 32*t* is located forward (that is, on the left side in FIG. 2) of the heel portion L2 of the foot DL in the vehicle front-rear direction when the foot DL is placed on the pedal body 24*p* of the accelerator pedal 24*a*. Details will be described with reference to FIG. 4. With such a configuration, when a frontal collision occurs in the vehicle 10 (see FIG. 1), the contact surface 32*t* comes into contact with the heel portion L2 of the foot DL of the driver D1. Further, the contact surface 32*t* extends in the vehicle width direction. Therefore, the contact surface 32*t* is more likely to come into contact with the heel portion L2 of the foot DL even when the heel portion L2 is displaced in the vehicle width direction in the case of occurrence of a frontal collision. Further, the raised portion 32 is located forward of the heel portion L2 of the foot DL in the vehicle front-rear direction even when the foot DL is placed on the pedal body 24p of the brake pedal 24b. With this configuration, even in the case where the foot DL is placed on the pedal body 24p of the brake pedal 24b, the raised portion 32 comes into contact with the heel portion L2 of the foot DL of the driver D1 when a frontal collision occurs in the vehicle 10 (see FIG. 1).

Figure 3:
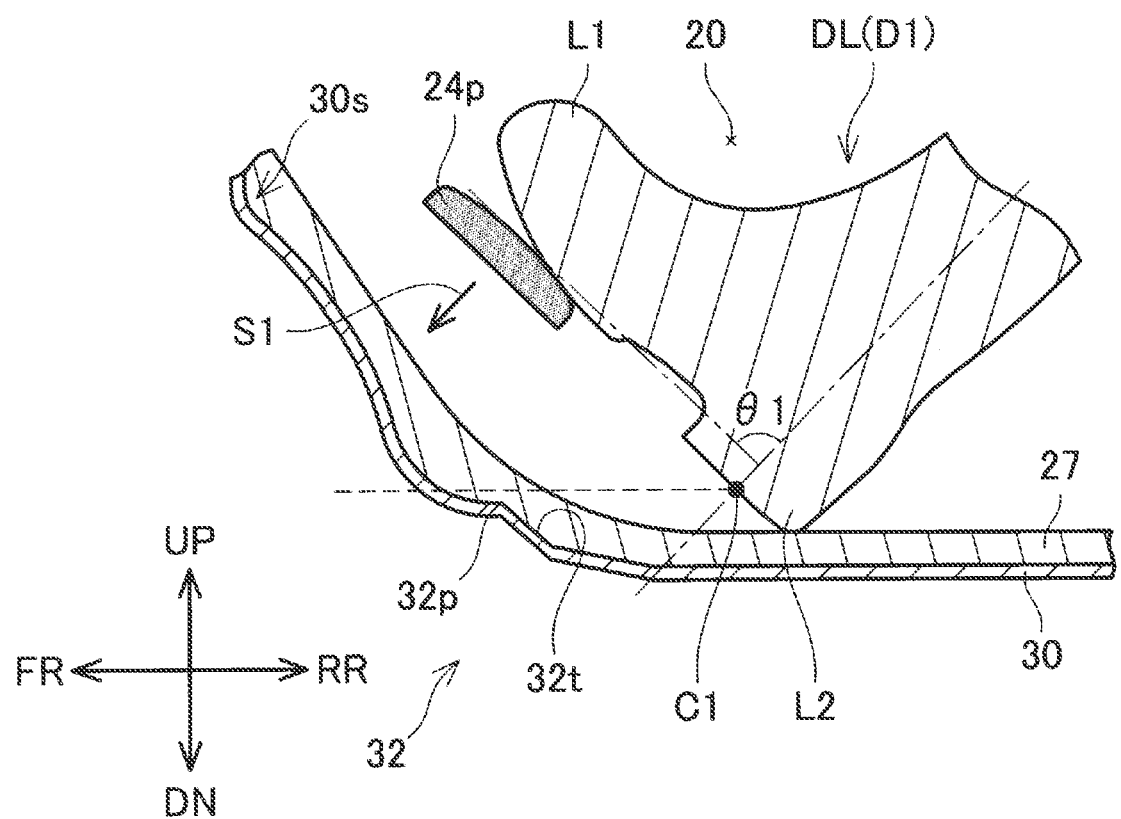
FIG. 3 is a sectional view taken along the line III-III shown in FIG. 2.

With reference to FIG. 3, a positional relationship among the pedal body 24p of the accelerator pedal 24a, the floor panel 30, and the foot DL of the driver D1 when the vehicle 10 (see FIG. 1) is traveling will be described. In FIG. 3, only the pedal body 24p is shown and the pedal shaft 24s (see FIG. 2) is omitted in order to help understanding. Further, although not shown in FIGS. 1 and 2, a floor carpet 27 is placed on an upper surface of the floor panel 30. The floor carpet 27 is an interior part that covers the upper surface of the floor panel 30 that is a sheet metal part, and is typically made of a synthetic resin.

When the foot DL is placed on the pedal body 24p of the accelerator pedal 24a, the driver D1 brings the front portion L1 into contact with the pedal body 24p and the lower end portion of the heel portion L2 with the floor carpet 27. As a result, an angle θ1 of the ankle of the foot DL is a substantially right angle. The driver D1 moves the front portion L1 toward the inclined portion 30s of the floor panel 30 with the heel portion L2 that is in contact with the floor carpet 27 as the point of origin. As a result, the angle θ1 of the ankle of the foot DL becomes larger than a substantially right angle. The pedal body 24p is operated toward the inclined portion 30s by the driver D1 of the vehicle 10 as shown by the arrow S1 in FIG. 3. As a result, the vehicle 10 accelerates.

As described above, the floor panel 30 includes the inclined portion 30s. A space for the accelerator pedal 24a to stroke is provided between the inclined portion 30s and the pedal body 24p. The raised portion 32 is provided integrally with a lower portion of the inclined portion 30s of the floor panel 30. The raised portion 32 is raised from the inclined portion 30s toward the vehicle cabin 20. As described above, the floor panel 30 is a sheet metal part formed by stamping. Therefore, the raised portion 32 can be provided integrally with the floor panel 30 relatively easily. Further, the raised portion 32 is provided integrally with the floor panel 30, whereby the number of parts and the mass are reduced as compared with the structure in which the raised portion 32 is configured using a separate part. Further, the raised portion 32 provided integrally with the floor panel 30 also has a function as a bead for improving the rigidity of the floor panel 30.

As described with reference to FIG. 2, the raised portion 32 has the peak portion 32p and the contact surface 32t. As shown in FIG. 3, the peak portion 32p is a portion that most protrudes from the inclined portion 30s toward the vehicle cabin 20. As shown by the broken line in FIG. 3, the peak portion 32p is located below a center C1 of the heel portion L2. With this configuration, even when the driver D1 depresses the pedal body 24p and the front portion L1 of the foot DL comes close to the inclined portion 30s, the back surface of the foot DL (that is, the surface on the lower side in FIG. 3) does not contact the peak portion 32p. Therefore, the driver D1 does not recognize the peak portion 32p when the driver D1 depresses the pedal body 24p. With this configuration, the driver D1 can smoothly operate the pedal body 24p with the foot DL without any discomfort.

Figure 4:
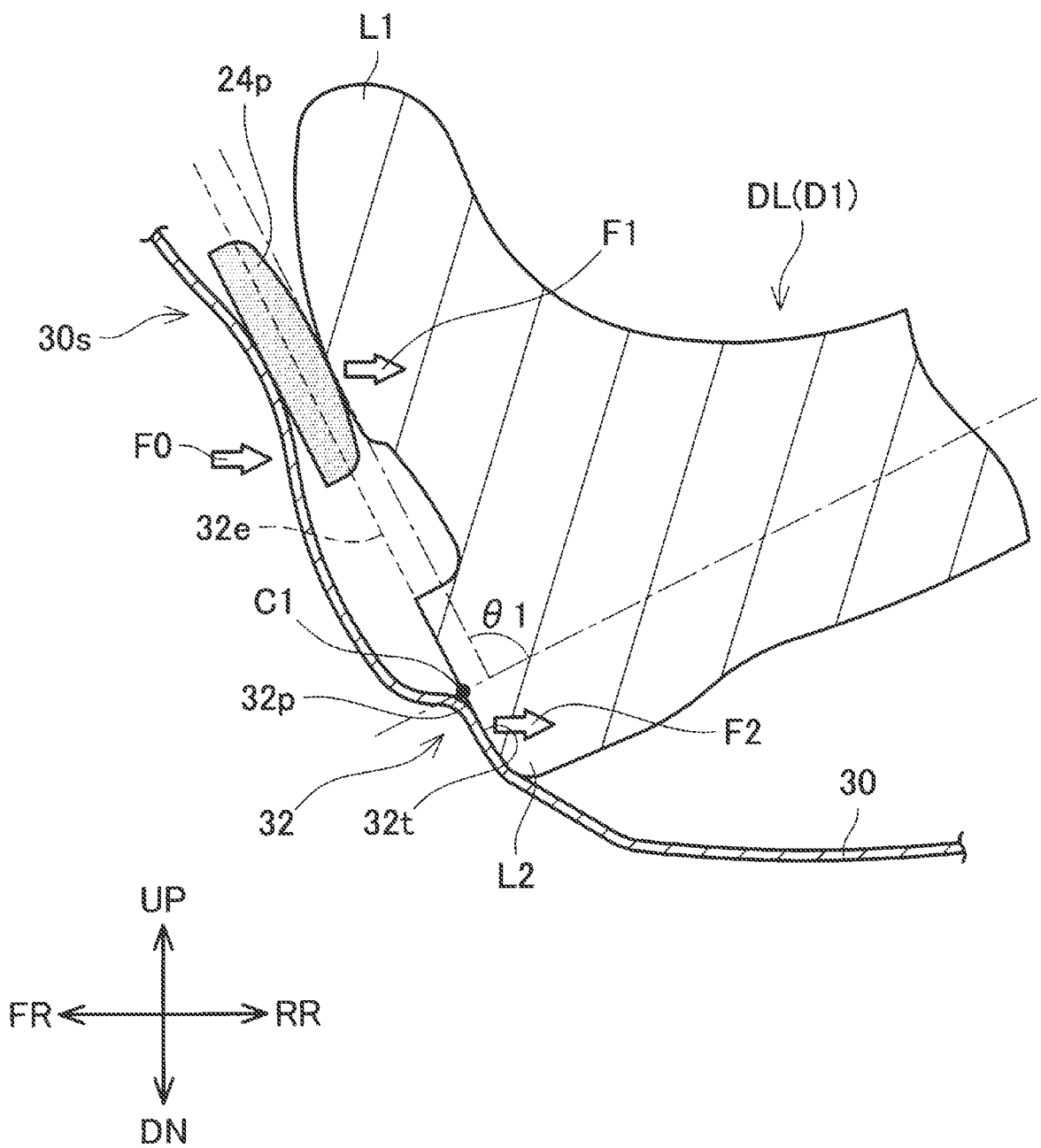
FIG. 4 is an enlarged view showing a relationship between a pedal body and a foot when a frontal collision occurs with the vehicle according to the embodiment.

With reference to FIG. 4, a positional relationship among the floor panel 30, the pedal body 24p, and the foot DL when a frontal collision occurs with the vehicle 10 (see FIG. 1) will be described. The floor carpet 27 (see FIG. 3) that is made of resin and has lower rigidity than that of the floor panel 30 that is the sheet metal part has less influence on the pedal body 24p and the foot DL at the time of a collision. Therefore, in FIG. 4 showing the state at the time of collision, the illustration thereof is omitted. When a frontal collision occurs, an obstacle applies a collision load F0 to the vehicle 10 from the front of the vehicle. When this occurs, the dash panel 22 (see FIG. 1) and the inclined portion 30s of the floor panel 30 are pushed rearward in the vehicle (that is, toward the right side in FIG. 4). As a result, the inclined portion 30s presses the pedal body 24p against the back surface of the front portion L1 of the foot DL. With this configuration, the pedal body 24p applies a load F1 to the front portion L1 of the foot DL.

Further, when the inclined portion 30s is pushed rearward in the vehicle, the contact surface 32t of the raised portion 32 located forward of the heel portion L2 in the vehicle front-rear direction comes into contact with the back surface of the heel portion L2 of the foot DL. As a result, the contact surface 32t applies a load F2 to the heel portion L2. As described above, a part of the collision load F0 generated by the frontal collision is dispersed into the load F1 via the pedal body 24p and the load F2 via the contact surface 32t. One of the dispersed loads, that is, the load F1 pushes the front portion L1 of the foot DL rearward in the vehicle, and the other of the dispersed loads, that is, the load F2 pushes the heel portion L2 of the foot DL rearward in the vehicle. As described above, in the vehicle (see FIG. 1) disclosed in the present specification, the contact surface 32t of the raised portion 32 provided integrally with the inclined portion 30s is brought into contact with the heel portion L2 so as to regulate the forward movement of the heel portion L2 in the vehicle beyond the raised portion 32 at the time of a frontal collision. As a result, even when a frontal collision occurs, the angle θ1 of the ankle of the foot DL is unlikely to be an acute angle. Accordingly, it is possible to regulate the forward movement of the heel portion L2 in the vehicle in a smaller space as compared with the conventional technique of restricting the movement of the heel portion L2 while moving the foot DL forward in the vehicle, such as the tibia pad.

Further, as shown in FIG. 4, when a frontal collision occurs and the pedal body 24p comes closest to the inclined portion 30s, the front portion of the pedal body 24p is located forward of an extension surface 32e of the contact surface 32t in the vehicle front-rear direction. With such a configuration, the pedal body 24p and the contact surface 32t can hold the angle θ1 of the ankle of the foot DL at a substantially right angle when a frontal collision occurs.

Although the embodiment has been described in detail above, the embodiment is merely an example and does not limit the scope of claims. The techniques described in the claims include various modifications and alternations of the specific example illustrated above. Modifications of the above-described embodiment are listed below.

First Modification

In the above-described embodiment, the raised portion 32 has the peak portion 32p extending along the vehicle width direction and the contact surface 32t spreading rearward from the peak portion 32p in the vehicle front-rear direction. However, in a first modification, the raised portion 32 may be a raised portion that does not have the peak portion 32*p* and the contact surface 32*t*. In that case, for example, the raised portion 32 may be a raised portion having a circular shape in a plan view, or such raised portions may be provided at a plurality of locations.

Second Modification

In the above-described embodiment, the peak portion 32*p* is located below the center C1 of the heel portion L2. However, in a second modification, the peak portion 32*p* may be located above the center C1.

Third Modification

In the above-described embodiment, the raised portion 32 is located forward of the heel portion L2 in the vehicle front-rear direction when the foot DL of the driver D1 is placed on the accelerator pedal 24*a* and when the foot DL is placed on the brake pedal 24*b*. In a third modification, the raised portion 32 may extend in the vehicle width direction so as to be located forward of the heel portion L2 in the vehicle front-rear direction only when the foot DL is placed on the accelerator pedal 24*a*, for example. Further, two raised portions may be located corresponding to both of the pedals.

Although the specific examples have been described in detail above, these are merely examples and do not limit the scope of claims. The techniques described in the claims include various modifications and alternations of the specific example illustrated above. The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. A vehicle, comprising:
a floor panel that constitutes a floor of a vehicle cabin of the vehicle and has an inclined portion in a front portion of the floor panel, the inclined portion being inclined upward toward a front side of the vehicle; and
a pedal that is disposed rearward of the inclined portion of the floor panel in a vehicle front-rear direction and operated by a driver of the vehicle toward the inclined portion, wherein:
a raised portion that is raised toward the vehicle cabin is provided integrally with the inclined portion of the floor panel; and
when the driver places a foot on the pedal, the raised portion is located forward of a heel portion of the foot in the vehicle front-rear direction,
wherein the floor panel includes a floor panel upper surface, the floor panel upper surface of the floor panel forms an upper surface of both the inclined portion and the raised portion.

2. The vehicle according to claim 1, wherein:
the raised portion has a peak portion extending along a vehicle width direction and a contact surface spreading rearward from the peak portion in the vehicle front-rear direction; and
when the driver places the foot on the pedal, the contact surface is located forward of the heel portion of the foot in the vehicle front-rear direction.

3. The vehicle according to claim 2, wherein when the pedal comes closest to the inclined portion, at least a part of the pedal is located forward, in the vehicle front-rear direction, of an extension surface that is an extension of the contact surface toward the pedal.

4. The vehicle according to claim 2, wherein the peak portion of the raised portion is located below a center of the heel portion of the driver.

5. The vehicle according to claim 1, wherein the pedal is an accelerator pedal that accelerates the vehicle as the accelerator pedal is operated toward the inclined portion.

6. The vehicle according to claim 2, further comprising a brake pedal, wherein the peak portion extends in a vehicle width direction so as to bridge between the pedal and the brake pedal.

\* \* \* \* \*